(12) United States Patent
Talwar et al.

(10) Patent No.: US 9,395,786 B2
(45) Date of Patent: Jul. 19, 2016

(54) CROSS-LAYER POWER MANAGEMENT IN A MULTI-LAYER SYSTEM

(75) Inventors: Vanish Talwar, Palo Alto, CA (US);
Jeffrey S. Autor, Houston, TX (US);
Sanjay Kumar, Atlanta, GA (US);
Parthasarathy Ranganathan, Fremont, CA (US)

(73) Assignee: Hewlett Packard Enterprise Development LP, Houston, TX (US)

(\*) Notice: Subject to any disclaimer, the term of this patent is extended or adjusted under 35 U.S.C. 154(b) by 2414 days.

(21) Appl. No.: 12/248,648

(22) Filed: Oct. 9, 2008

(65) Prior Publication Data

US 2009/0132840 A1     May 21, 2009

Related U.S. Application Data

(60) Provisional application No. 60/989,184, filed on Nov. 20, 2007.

(51) Int. Cl.
*G06F 1/32*     (2006.01)
*G06F 1/26*     (2006.01)
*G06F 9/455*     (2006.01)

(52) U.S. Cl.
CPC .............. *G06F 1/3203* (2013.01); *G06F 1/329* (2013.01); *G06F 9/45558* (2013.01); *G06F 2009/4557* (2013.01); *G06F 2009/45591* (2013.01); *Y02B 60/144* (2013.01)

(58) Field of Classification Search
CPC ................................ G06F 1/3203; G06F 1/329
USPC ................................................. 713/300–340
See application file for complete search history.

(56) References Cited

U.S. PATENT DOCUMENTS

| | | | | |
|---|---|---|---|---|
| 5,590,342 A | * | 12/1996 | Marisetty | 713/324 |
| 6,122,745 A | * | 9/2000 | Wong-Insley | 713/300 |
| 6,131,166 A | * | 10/2000 | Wong-Insley | 713/300 |
| 6,460,070 B1 | | 10/2002 | Turek et al. | |
| 7,146,513 B2 | * | 12/2006 | Misaka et al. | 713/320 |
| RE39,837 E | * | 9/2007 | Marisetty | 713/324 |
| 7,308,591 B2 | * | 12/2007 | Dubinsky | 713/324 |
| 7,739,532 B2 | * | 6/2010 | Grobman | 713/322 |
| 7,844,839 B2 | * | 11/2010 | Palmer et al. | 713/300 |
| 8,060,760 B2 | * | 11/2011 | Shetty et al. | 713/300 |
| 2003/0046396 A1 | | 3/2003 | Richter et al. | |
| 2004/0019668 A1 | | 1/2004 | Kakadia | |
| 2005/0060590 A1 | * | 3/2005 | Bradley et al. | 713/320 |
| 2005/0138438 A1 | * | 6/2005 | Bodas | 713/300 |
| 2007/0192641 A1 | * | 8/2007 | Nagendra et al. | 713/320 |
| 2007/0245163 A1 | * | 10/2007 | Lu et al. | 713/300 |
| 2008/0141048 A1 | * | 6/2008 | Palmer et al. | 713/300 |

OTHER PUBLICATIONS

Anderson, O.T. et al., "Global Namespace for Files", IBM Systems Journal, vol. 43, No. 4, 2004.
Barham, P. et al., "Xen and the Art of Virtualization", ACM SOSP'03, Oct. 2003.

(Continued)

*Primary Examiner* — Tim T Vo
*Assistant Examiner* — Phong H Dang
(74) *Attorney, Agent, or Firm* — Mannava & Kang, P.C.

(57) ABSTRACT

A method for cross-layer power management in a multi-layer system includes determining whether there is a service level violation for an application running on a hardware platform. Power consumption of the hardware platform is controlled in response to the service level violation.

15 Claims, 11 Drawing Sheets

(56) References Cited

OTHER PUBLICATIONS

Chase, J. et al., "Managing Energy and Server Resources in Hosting Centers", downloaded May 19, 2008.
VMware Consolidated Backup, http://www.vmware.com/products/vi/consolidated_backup.html, downloaded May 20, 2008.
Dell Unified Manageability Architecture, Oct. 30, 2006.
Heath, T. et al., "Energy Conservation in Heterogenous Server Clusters", ACM PPoPP'05, Jun. 2005.
HP AssetCenter Software, http://h20229.www2.hp.com/products/ovacen/index.html, downloaded May 15, 2008.
HP OpenView Enterprise Discovery Software, http://h20229.www2.hp.com/products/oventd/index.html, downloaded May 15, 2008.
HP Role of IPMI, SMASH, and WS-Managment in HP Proliant remote server managment, http://h20000.www2.hp.com/bc/docs/support/SupportManual/c00714935/c00714935.pdf.
ACPI, Advanced Configuration & Power Interface, http://www.acpi.info/, downloaded May 19, 2008.
DMTF, Common Information Model (CIM) Standards, http://www.dmtf.org/standards/cim/, downloaded May 15, 2008.
DMTF, Web-Based Enterprise Management (WBEM), http://www.dmtf.org/standards/wbem/, downloaded May 15, 2008.
Intellegent Platform Management Interface, http://www.intel.com/design/servers/ipmi/, downloaded May 19, 2008.
OpenWBEM, http://www.openwbem.org/, downloaded May 15, 2008.
VMware, http://www.vmware.com/, downloaded May 15, 2008, "Virtualization Overview".
Isci, C. et al., "Live, Runtime Phase Monitoring and Prediction on Real Systems with Application to Dynamic Power Management", downloaded May 20, 2008.
Kong, J. et al., "CameraCast: Flexible Access to Remote Video Sensors", downloaded May 20, 2008.
Kravets, R. et al., "Application-Driven Power Management for Mobile Communication", downloaded May 20, 2008.
Lee, E.K. et al., "Petal: Distributed Virtual Disks", Proc. of 7th International Conf. on Architectural Support for Programming Languages and Operating Systems, 1996.
Li, H. et al., "VSV: L2-Miss-Driven Variable Supply-Voltage Scaling for Low Power", IEEE MICRO-36, 2003.
Lu, Y. et al., "Low-Power Task Scheduling for Multiple Devices", International Workshop on Hardware/Software Codesign p. 39-43, 2000.
Moore, J. et al., "Making Scheduling "Cool": Temperature-Aware Workload Placement in Data Centers", downloaded May 20, 2008.
Muntz, D., "Building a Single Distributed File System from Many NFS Servers", HPL-2001-176, Jul. 12, 2001.
Nathuji, R. et al., "VirtualPower: Coordinated Power Managment in Virtualized Enterprise Systems", ACM SOSP'07, Oct. 2007.
Pike, R. et al., "The Use of Name Spaces in Plan 9", downloaded May 15, 2008.
Pillai, P. et al., "Real-Time Dynamic Voltage Scaling for Low-Power Embedded Operating Systems", downloaded May 20, 2008.
Pike, R. et al., "Plan 9 from Bell Labs", downloaded May 15, 2008.
Shih, E. et al., "Wake on Wireless: An Event Driven Energy Saving Strategy for Battery Operated Devices", ACM MOBICOM'02, Sep. 2002.
Stoess, J. et al., "Energy Management for Hypervisor-Based Virtual Machines", http://www.usenix.org/event/usenix07/tech/full_papers/stoess/stoess_html/energy_mgmt_vms.html.
Sugerman, J. et al., "Virtualizing I/O Devices on VMware Workstation's Hosted Virtual Machine Monitor", USENIX Annual Technical Conference, Jun. 2001.
Understanding Inventory, Configuration and IT Asset Management, http://h20229.www2.hp.com/solutions/asset/swp/4aa0-6093enw_asset_swp.pdf, downloade May 15, 2008.
VMware Virtual Appliance, http://www.vmware.com/appliances/, downloaded May 20, 2008.
WMI Architecture, http://msdn.microsoft.com/en-us/library/aa394553(printer).aspx, downloaded May 15, 2008.
Wright, C. P. et al., "Versatility and Unix Semantics in a Fan-Out Unification File System", downloaded May 15, 2008.
Zhang, Z. et al., "Designing a Robust Namespace for Distributed File Services", downloaded May 15, 2008.

* cited by examiner

CROSS-LAYER POWER MANAGEMENT IN A MULTI-LAYER SYSTEM

CROSS REFERENCE TO RELATED APPLICATION

This application is related to U.S. Provisional Patent Application Ser. No. 60/989,184, by Talwar et al., filed on Nov. 20, 2007 and entitled, "Coordinated Management In Virtualized Systems Using Management Brokers and Management Channels" which is incorporated by reference in its entirety.

BACKGROUND

Given the ever-increasing cost of energy, power conservation has become a prime consideration for products and services. This is especially true for data center management, where the cost of power can consume a large portion of a budget and profits. In a data center, power is not only needed to run computer systems, but is also needed to run crucial ancillary systems, such as cooling systems.

In addition to conserving power and minimizing other costs, data centers typically must be responsive to customers requirements for running their applications. In many instances, customers, through a contractual arrangement, employ a data center to run their software applications. The contractual arrangement specifies service level agreements (SLAs), whereby customers specify service levels that must be met when running their applications. Thus, in addition to minimizing costs, data centers must ensure SLAs are satisfied.

Some data center management solutions may monitor utilization of central processing units (CPUs) to minimize SLA violations. For example, if utilization of a CPU hosting a customer's application exceeds a threshold, then the application may be moved to a second, less-loaded CPU. This approach may initially prevent SLA violations. However, the utilization of the second CPU may increase beyond the threshold in a relatively short period of time, and as a result, the application is continuously moved to different CPUs. This not only reduces stability of the system, but also may result in increased power consumption, and, as a result, in increased data center management costs.

BRIEF DESCRIPTION OF DRAWINGS

The embodiments of the invention will be described in detail in the following description with reference to the following figures.

DETAILED DESCRIPTION OF EMBODIMENTS

Figure 1:
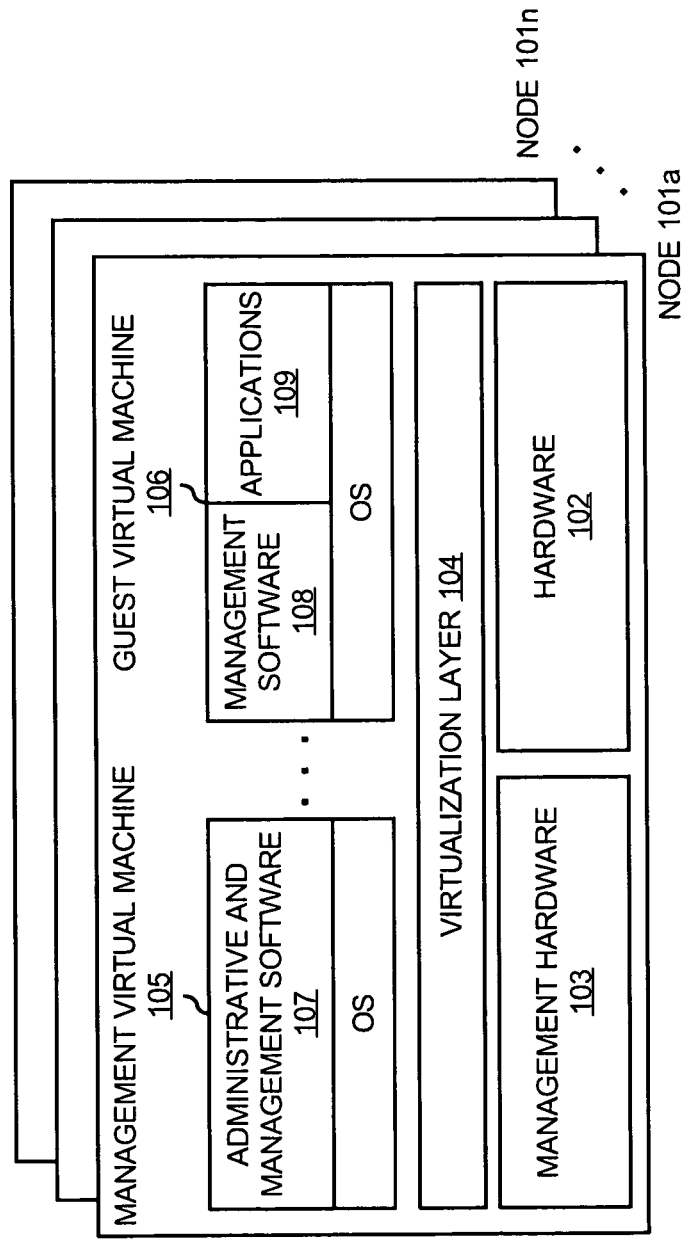
FIG. 1 illustrates a system, according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

A multi-layer system includes hardware layer, a virtualization layer and an application layer. The hardware layer includes a computer hardware platform for running applications in the application layer. The hardware layer may include one or more of processors (CPUs), memory, input/output interface, busses and device and network interconnects, management processors, etc. The application layer may include applications, management software, and other software. The virtualization layer includes VMs and virtualization software, such as a hypervisor, for managing the VMs. Each of the VMs includes an operating system (OS).

According to an embodiment, each of the layers may include sensors and/or actuators that may be used for controlling power consumption for the system and for managing service level violations. Also, a mechanism comprising management brokers, management agents and management channels is used to communicate and collect information from sensors in different layers and to control actuators in different layers to manage and control power consumption.

According to an embodiment, cross-layer power management is performed based on service level violations. Through experimentation, it has been determined that improved power conservation can be achieved by controlling power consumption in response to service level violations rather than solely in response to utilization of a computer resource, such as CPU utilization. For example, rather than adjusting load when CPU utilization becomes excessive, load is adjusted or another actuator is invoked in response to a service level violation.

A service level violation occurs when a threshold for a predetermined application metric is received. The thresholds are often described as performance goals in an agreement between a customer and a service provider, i.e., a service level agreement (SLA). In one example, a performance goal is based on the performance of the application as experienced by the user. For example, response time<10 ms is an example of a service level for an application. If response time exceeds 10 ms, then a service level violation has occurred. Other conventional service level metrics may be used.

As described above, actuators at different layers of the system may be invoked to control power consumption. According to embodiments, in response to a service level violation, dynamic frequency and voltage scaling (DVFS) of CPUS, VM migration, intelligent VM migration or other types of actuators are used to control power consumption. Also, a power budget may be considered when controlling power consumption. For example, a power budget specifies a maximum power consumption, i.e., a power cap, for a system. If the power cap is exceeded, an actuator, such as VM migration, is invoked to regulate power consumption. The power cap is considered in conjunction with service level violations when making power management decisions.

FIG. 1 illustrates a system 100, according to an embodiment. The system 100 comprises a plurality of nodes 101a-n. Each node includes a set of resources comprising hardware and software that are allocated to run applications. The resources may be from a pool of resources in a resource-on-demand system. For example, resources from the pool are selected and allocated to a particular demand. The resources may be processors, memory, disks, software, etc., allocated to a demand or may be entire servers allocated to a demand.

As shown in FIG. 1, the nodes 101a-n provide virtualized environments to run host applications. As shown for node 101a, the nodes include hardware 102, such as processors, memory, disks, interfaces, etc. The hardware 102 stores and runs software described below, including VMs, operating systems, management applications, M-brokers, M-agents, etc. The nodes also include management hardware 103. Management hardware may included a management processor, such as Hewlett-Packard's iLO/GSP and Intel's AMT (iLO stands for Integrated Lights Out, GSP stands for Guardian Service Processor, AMT stands for Active Management Technology). A management processor may communicate with processors/cores in the hardware 102 to receive information, for monitoring the processors and managing the processors. The management processor may include firmware for performing management functions on the processors, such as powering on or off or rebooting, monitoring temperature, power, and other attributes, and performing other management functions. The management hardware 103 may include other hardware, such as sensors, storage controllers, etc. The hardware 102 and the management hardware 103 are included in a hardware layer.

A virtualization layer 104 creates a virtualized environment for running virtual machines (VMs), such as the management VM (MVM) 105 and the guest VM 106. The virtualization layer allows multiple operating systems to be run on the hardware 102 at the same time. The virtualization layer 104 includes software for managing the VMs, including creating, starting, stopping and removing virtual machines from a hardware platform. One example of the virtualization layer 104 is the Xen hypervisor.

Each VM in the node 101a may include an application layer including applications. The MVM 105 is a special VM that includes administrative and management software 107 for managing guest VMs running on the hardware 102. The guest VM 106 runs management software application(s) 108 for managing the VM and communicating information with the MVM 105. The VM 106 also runs conventional applications 109, such as word processors, spreadsheets and other end-user applications. Multiple guest VMs and multiple MVMs may be run on each node.

In today's systems, individual management entities, which may include management software in a VM or a management hardware, operate within separate isolated environments and are non-coordinated among each other. For example, the individual management entities may be performing the same or different functions. The management entities, for example, may be performing power management at different levels or they may be performing different functions, such as power management and SLA management. In either case, the management entities may not be coordinated and in some cases cannot be coordinated because of lack of privileges, inability to communicate with different management entities, and inability to process information from other management entities. This leads to reduced management functionality and potential inefficiency. According to an embodiment, management channels (M-channels) and management brokers (M-brokers) are used to coordinate among different management entities. Management entities in the embodiments may include the administrative and management software 107 in the MVM 105, the management software 108 in the guest VM 106, and the management hardware 103 including firmware. These entities may perform different and/or the same or similar functions. M-channels provide bidirectional information exchange among the hardware 102 and 103, VMs 105 and 106, and management software 107 and 108 and applications 109. M-brokers provide a framework for implementing coordination policies and leveraging information provided through M-channels.

Figure 2:
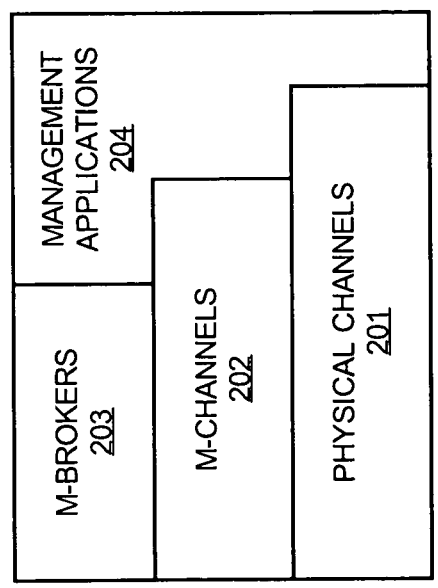
FIG. 2 illustrates a coordination stack with M-brokers and M-channels, according to an embodiment.

FIG. 2 shows the deployment stack with M-channels and M-Brokers. As shown in FIG. 2, M-channels 202 are built on top of existing physical channels 201, such as shared memory channels, sockets, and TCP/IP channels. M-brokers 203 use the M-channels 202 for communication and execution of coordination policies. The M-brokers 203 interact closely with existing management applications and enhance their functionality. The M-channels 202 and the M-brokers 203 do not prescribe how management tasks are carried out. This permits applications to either use one M-broker servicing multiple platforms or use distributed implementations where multiple M-broker instantiations cooperate to manage VMs and other tasks. Similarly, the M-channels 202 may carry simple monitoring data, like system provided information about current CPU usage, or they could be used for rich data and control exchanges between VMs and the management hardware and/or management software. In addition to the M-brokers 203, M-agents are also used to communicate information on the M-channels 202. The M-agents are described below. The management applications 204 perform the management tasks for the node, and may include the application and management software 107 on the MVM 105, management software 108 or applications 109 on the guest VM 106 or firmware on the management hardware 103.

Figure 3A:
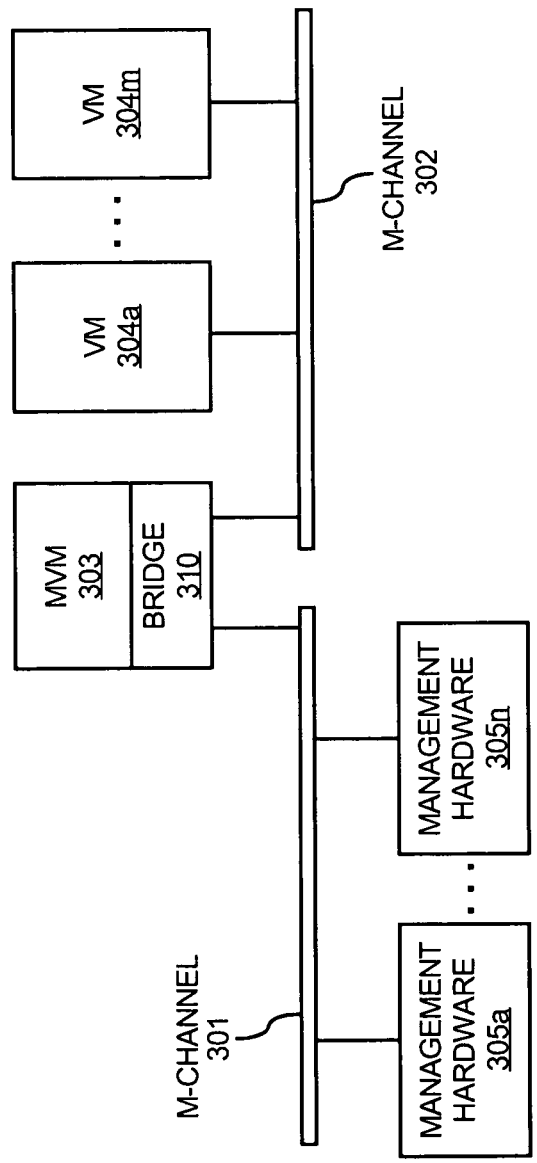
FIGS. 3A-B illustrate M-channels in a single system and in a distributed system, according to embodiments.
Figure 3B:
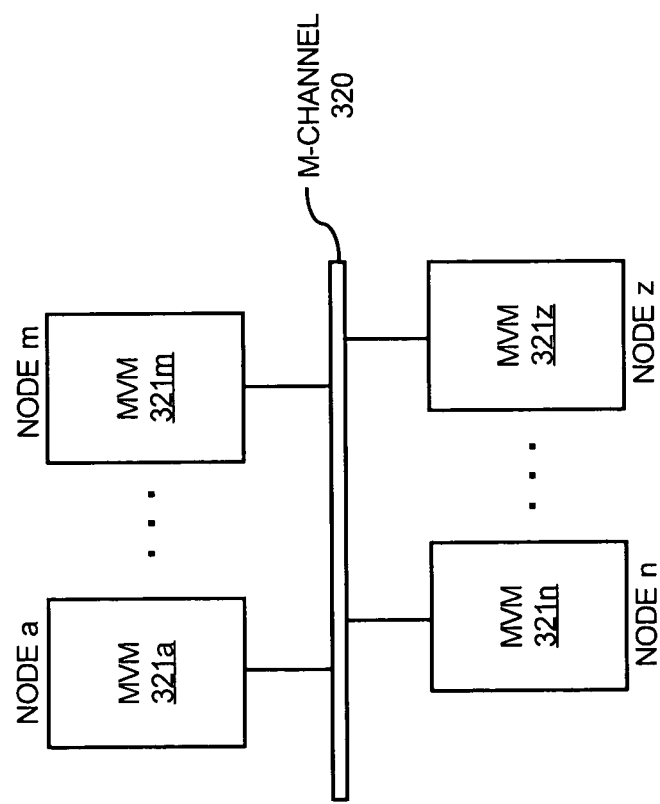

The M-channels 202 are special inter-VM and intra-VM communication channels which transfer commands and information between the MVM 105 and other VMs, such as the guest VM 106, as well as between the MVM 105 and the management hardware 103. The M-channels 202 can be instantiated in a single system and in a distributed system context. FIGS. 3A-B illustrate the M-channels 202 in a single system, such as in a node, and the M-channels 202 in a distributed system, such as channels between nodes.

As shown in FIG. 3A, M-channels 301 and 302 are used in a single system, such as in a node. The M-channels 301 and 302 are used for communication among VMs, including VMs 304a-m and the MVM 303 and for communication between the management hardware 305 and the VMs. The VMs 304a-m may include guest VMs managed by the MVM 303. The management hardware 305 may include components 305a-n, such as management processors, sensors and storage controllers.

The M-channels also include a communication bridge 310 that redirects messages from one M-channel to the other according to a set of policies. The redirection is transparent to the sending and receiving management entities. The bridge 310 may be instantiated in an MVM, such as shown in FIG. 3A. The bridge 310 is operable to perform protocol conversion when forwarding messages to the receiving management entity. For example, the bridge 310 puts messages from the VMs 304a-m or the MVM 303 in a format understood by a management processor in the management hardware 305 and vice versa. Also, the bridge 310 may implement trust policies. For example, trust policies may define which of the VMs 304a-m and MVM 303 are allowed to communicate with the management hardware 305 to prevent malicious VMs from causing failures in the node. Also, the bridge 310 may perform flow control to maintain a predetermined quality of service (QoS). For example, the management processor may be able to process messages at a predetermined rate. In certain situations there may be a high rate of interactions between VMs and management hardware, such as when monitoring for failures. The bridge 310 may cache messages being sent to a management processor to accommodate the message processing rate of the management processor.

FIG. 3B illustrates an M-channel 320 in a distributed system. The M-channel 320 is used for exchanging information among the MVMs 321a-z in nodes a-z.

In either a single system or in a distributed system, the M-channels may be bi-directional and can be used for exchanging both control information and actual data. For VM migration, the M-channels may support dynamic disconnection and reconnection between VMs and MVMs. Also, for flexibility, the M-channels may deliver messages using both point-to-point and broadcast or multicast protocols. Similarly, delivery of messages can be synchronous or asynchronous depending on the application being supported. Asynchronous messaging may be used when streaming monitoring data on a continuous basis. The underlying physical channels for the M-channels may be physical channels already existing in the system.

Challenges in realizing M-channels are caused by their use in different settings and for different management strategies. For instance, since M-channels must continue to operate even when VMs migrate between different computing platforms, they must be capable of using message-based data transports. At the same time, potentially high rate interactions between VMs and management hardware when monitoring for failures in reliability management require an implementation enabling substantial data exchanges between VMs and MVMs. Thus, the M-channels may be implemented using multiple methods.

M-channels between MVMs and management hardware can be implemented by using a device driver in an MVM which handles the particular management hardware and exports device specific interfaces to M-brokers. The M-channels between VMs and MVMs may be implemented using MVM-provided inter-domain communication channels. These channels typically use shared memory communication with very good latency characteristics that could enable management applications to react quickly to various notifications. In another example, the M-channels can be implemented over the network, for example, using socket application program interfaces (APIs)). This is also an explicit communication channel and hence a generic solution to be used with management agents. This solution, however, has higher latency compared to shared memory communication. This solution, however, enables M-channels to span multiple physical machines creating M-channels between MVMs running on different nodes. M-channels may also be provided between management hardware components, and can be built on top of the Intelligent Platform Management Interface (IPMI) standard.

Table 1 below shows a list of APIs that may be used by M-channels to communicate between VMs, including communication between MVMs and VMs over a shared memory channel. These APIs may also be used to communicate between management hardware and MVMs. The APIs are divided into the phases of discovery, connection establishment, message communication, and connection termination.

TABLE 1

M-Channel APIs

| API | Return Value |
| --- | --- |
| discover(app_name) | List of agents ids {ids} |
| wait_on_discover(app_name component_id) | The broker id-broker_id |
| open(id,DELIVERY_TYPE, PHY_CHANNEL) | Connection descriptor-conn_desc |
| open_bcast(PHY_CHANNEL) | Connection descriptor-conn_desc |
| Open_mcast(MCAST_GROUP{ids},, PHY_CHANNEL) | Connection descriptor-conn_desc |
| send(conn_dec, msg_type,msg) | non-blocking send, is success or failure return |
| receive(conn_dec, msg_type,msg) | Blocking receive into msg, is successor failure return |
| close(conn_desc) | Success or failure |

As described with respect to FIG. 2, M-brokers are used as policy managers that execute coordination policies and leverage information received through M-channels. Coordination is between management hardware and management applications (e.g., software 107, 108 and 109 shown in FIG. 1), as well as across VMs. A given system may have several M-brokers. An M-broker may be provided for each management application, which may include a management application running on an MVM or a guest VM. Furthermore, M-brokers may be provided on management hardware. In addition to executing coordination policies, the M-brokers may also provide a bridge, such as the bridge 310 shown in FIG. 3A, allowing communication between management hardware and management applications.

The M-broker and M-agents, which are described below, may be implemented as software stored on a computer readable medium and executed by hardware. The M-brokers and M-agents may be application-specific and may be implemented in the kernel level as well as the user level. In one embodiment, the M-brokers and M-agents are implemented as multi-threaded applications. The actual management application-specific broker code is implemented as a thread in the application. The M-brokers and M-agents are multi-threaded because they communicate with multiple entities which usually operate independent of each other (e.g., management hardware, policy maker, M-channel, etc.). Different threads of the M-broker handle the communication with other VMs, management hardware and decision making algorithms. These M-brokers communicate with other M-agents and M-brokers on local machines using shared memory M-channels and with M-brokers on other machines using socket-based M-channels. To access the management hardware, an M-broker may utilize a driver-provided M-channel interface to read from and write to the device. The M-broker's interface to M-channels may also operate as the communication bridge 310 of FIG. 3A between the VMs and the management hardware. In this case, all the accesses to the management hardware from VMs must go through the M-broker.

Figure 4:
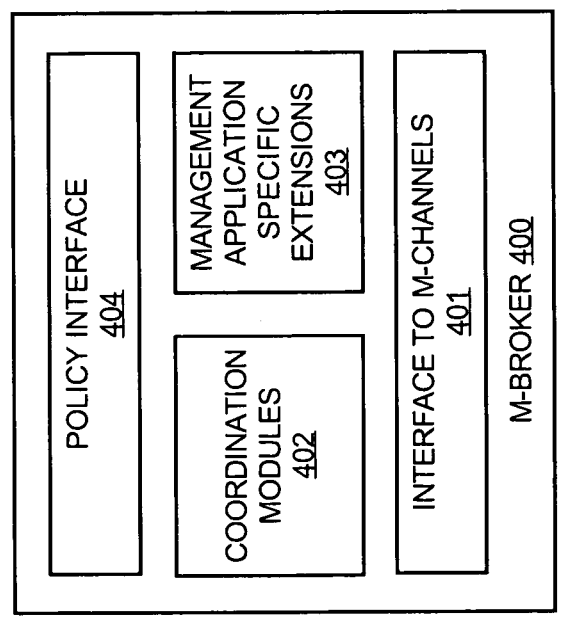
FIG. 4 illustrates an M-broker, according to an embodiment.

FIG. 4 shows the structure of an M-broker 400, according to an embodiment. The structure of the M-broker 400 shown in FIG. 4 may be used as a model for systematic development of M-brokers. The M-broker 400 includes an interface 401 to the M-channels, coordination modules 402, management application specific extensions 403 and a policy interface 404. The interface 401 may include the M-channel APIs shown in table 1. The interface 401 allows the M-broker 400 to communicate with other M-brokers and M-agents on the M-channels. The M-channel coordination modules 402 include protocols for message exchange between M-brokers and M-agents. In addition, the M-channel coordination modules 402 along with the extension modules 403 include the coordination policies and decision engine for making decisions based on coordination policies and received data.

Some examples of coordination polices relate to power management and storage backup. For example, for storage backup, a VM tracks disk activity and an M-agent running on the VM sends disk activity to an M-broker running on an MVM via an M-channel. The coordination module in the M-broker uses the information to create a replica by writing modified blocks to a replicated disk in parallel. This is one example of an actuation performed by the M-broker in response to the received information. In another example, the M-broker monitors for disk failures. In another example, a management application monitors activity for a VM and an M-agent for the management application sends the activity information to an M-broker via an M-channel. Based on a coordination policy, if activity is greater than or less than a threshold, the power state (p-state) of a CPU hosting the VM may be changed through frequency and voltage scaling. For example, the M-broker sends an actuation command to change the p-state to a management processor via an M-channel, and the management processor controls the processor to change the p-state. These are just some examples of coordination policies that may be implemented using an M-broker.

Some core coordination modules may implement the basic protocol for communication among the M-brokers and the M-agents. Also, the coordination modules 402 may be reused by all M-brokers for different management applications. The management application specific extensions 403 comprise code for implementing coordination polices with specific applications. The extensions 403 may include APIs for specific applications. The policy interface 404 provides an interface for receiving policies and storing policies. For example, the policy interface 404 receives policies from a policy maker described in further detail below.

Closely tied with M-brokers are M-agents. An M-agent is software that interacts with existing management applications and serves as a proxy for sending management information to other M-agents and M-brokers. Unlike M-brokers, however, an M-agent does not execute any coordination modules. As such, the M-agent is responsible for monitoring, passing information and receiving actuation commands.

Figure 5A:
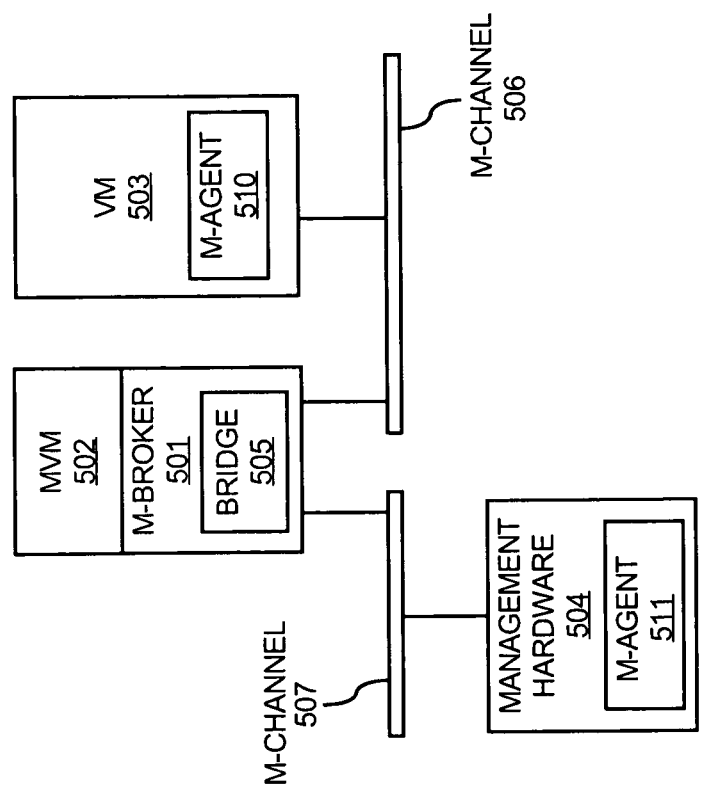
FIGS. 5A-C illustrate different deployment strategies for M-brokers, according to embodiments.
Figure 5B:
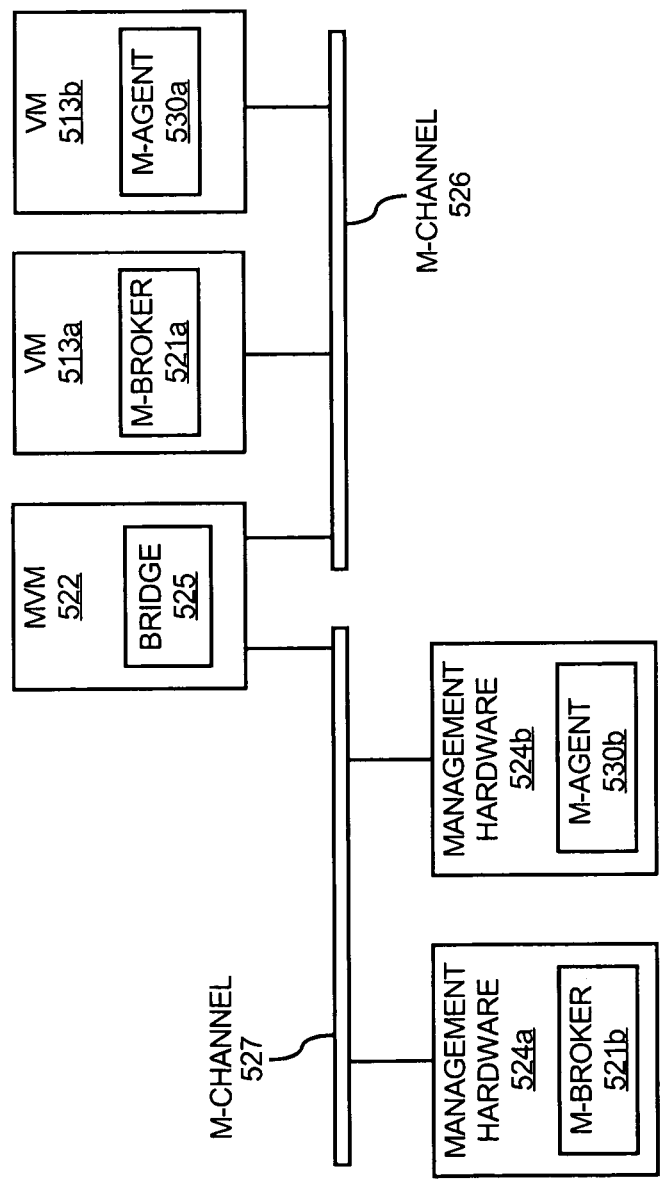
Figure 5C:
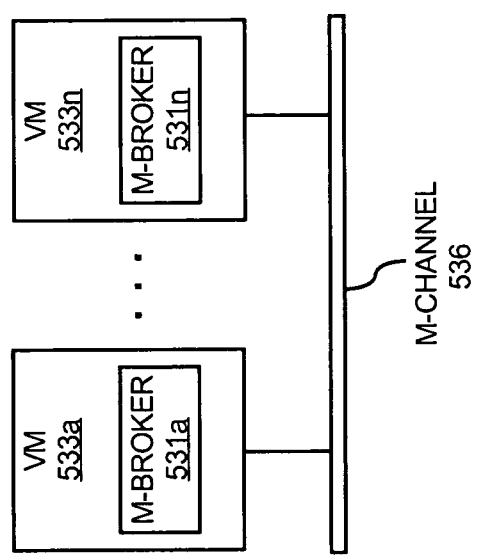

M-brokers can be instantiated with different deployment strategies. FIGS. 5A-C illustrate embodiments for deploying M-brokers in a single system and a distributed system. FIG. 5A shows an M-broker 501 in a single system providing a communication bridge 505, e.g., which may be the same as the communication bridge 310 shown in FIG. 3. The M-broker 501 is in an MVM 502 and communicates with M-agents 510 and 511 in the VM 503 and the management hardware 504 respectively via M-channels 506 and 507. The M-broker 501 provides coordination between firmware in the management hardware 504 and management applications in the MVM 502 and the VM 503.

FIG. 5B shows an M-broker 521a residing in a VM 513a and an M-broker 521b residing at the management hardware 524a. In this case, the M-brokers 521a-b provide coordination polices that are implemented at the management hardware 524a and management applications at the VM 513a. Another VM 513b may include an M-agent 530a, and another hardware component 524b of the management hardware may include an M-agent 530b. An MVM 522 includes a communication bridge 525 for providing bi-directional communication on the M-channels 526 and 527 between the management hardware 524a-b and the MVM 522 and the VMs 513a-b. FIG. 5B may represent components in a single node. Also, FIG. 5B shows an M-broker in management hardware and a guest VM. However, an M-broker may only be provided in management hardware, may only be provided in one or more guest VMS, or may be provided in both management hardware and a guest VM. In addition, as shown in FIG. 5A, the M-broker may be provided only in an MVM. Also, the M-broker(s) may be provided in any combination of an MVM and one or more of management hardware and a guest VM.

FIG. 5C shows a system where M-brokers 531a-n are distributed across VMs 533a-n. The VMs 533a-n may be in a single node or distributed across multiple nodes. The M-channel 536 may include one or more M-channels for a distributed system and/or a single system. The M-brokers 531a-n communicate and jointly make coordination decisions based on stored coordination policies.

Figure 6:
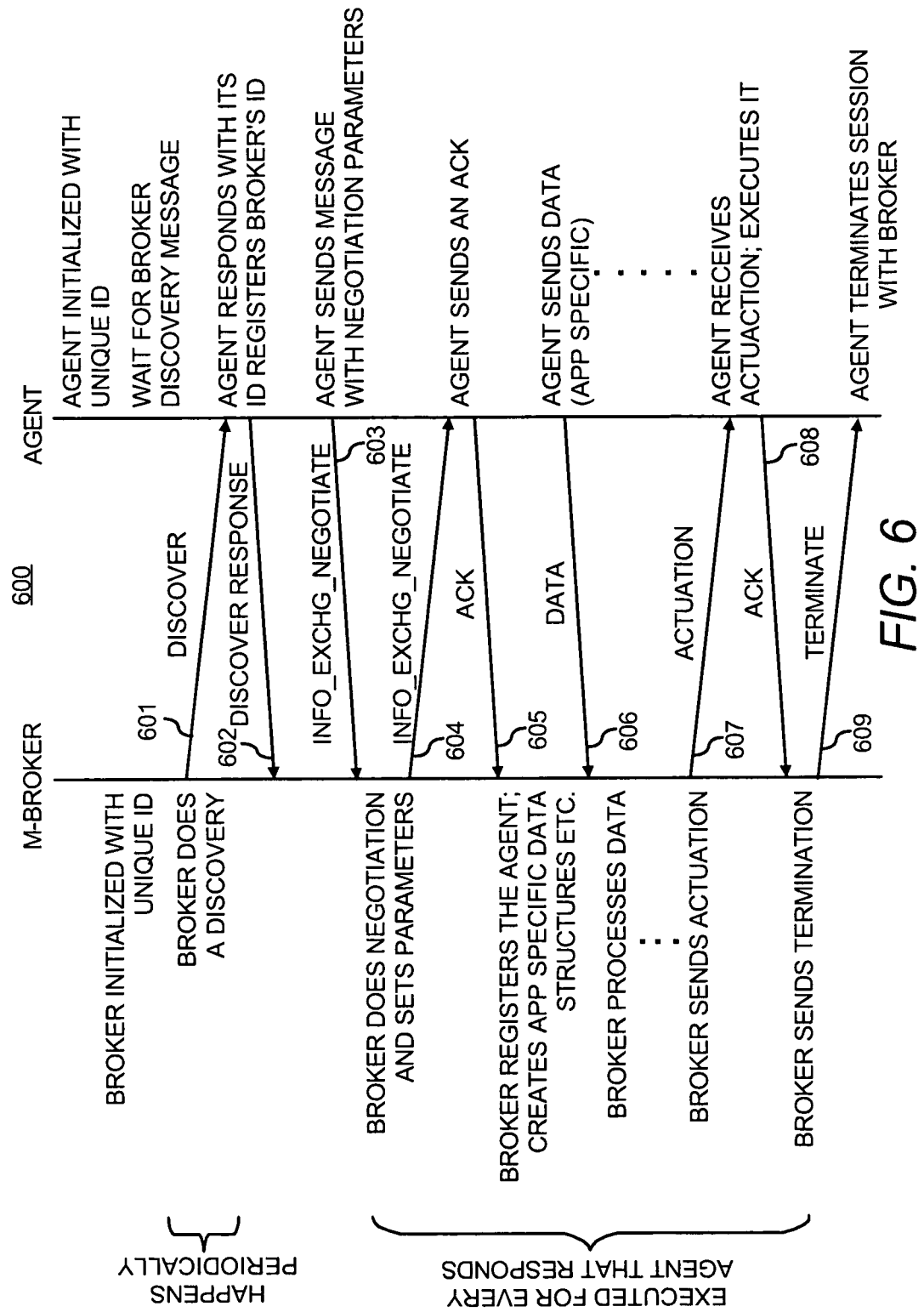
FIG. 6 illustrates message exchange between an M-broker and an M-agent, according to an embodiment.

In FIGS. 5A-C, the M-brokers and M-agents periodically exchange messages for purposes of coordination. As mentioned above, these messages are exchanged using M-channels. A well-defined application-level protocol may be used by the M-brokers and the M-agents to perform information exchange, coordination, and actuation. FIG. 6 shows an example of a timeline of message exchanges 600 between an M-broker and an M-agent, according to an embodiment. The messages in FIG. 6 are annotated with the message types and illustrates the control commands that may be used for the message type field in M-channel APIs.

The messaging in FIG. 6 includes message exchanges for phases of discovery, communication establishment, message exchange, and connection termination. The messaging in FIG. 6 may be applied between M-brokers, between M-agents, as well as between M-brokers and M-agents. Messages 601-602 are for discovery. Messages 603-605 are for session establishment, including negotiation of parameters for establishing and maintaining a session. Messages 606-608 include data exchange and actuation commands. For example, an M-broker receives power consumption information from a management application and based on a coordination policy instructs the M-agent to perform frequency scaling for a processor to reduce power consumption. After acknowledgement (e.g., message 608) that the actuation was performed, the session is terminated using message 609.

The addressing among the M-brokers and the M-agents takes place using a unique identifier associated with each of them, according to an embodiment. The addressing applies to both hardware and software components, and uniquely identifies components over a distributed system. The identifier comprises a tuple <Component ID, App ID> as the identifier. For the M-agent or the M-broker in the hardware component, <Component ID> may correspond to the machine serial number. For the M-agent or M-broker in a VM, <Component ID> may correspond to the <MVM IP, VM ID> where the MVM IP is the IP address of the MVM and the VM ID is the unique virtual machine ID assigned by the MVM to the VMs in the system including itself. App ID is the unique name given to a management application (e.g., power management, backup storage management, inventory management, etc.) for which coordination is being performed. The App ID may be uniquely assigned by a system administrator.

Figure 7:
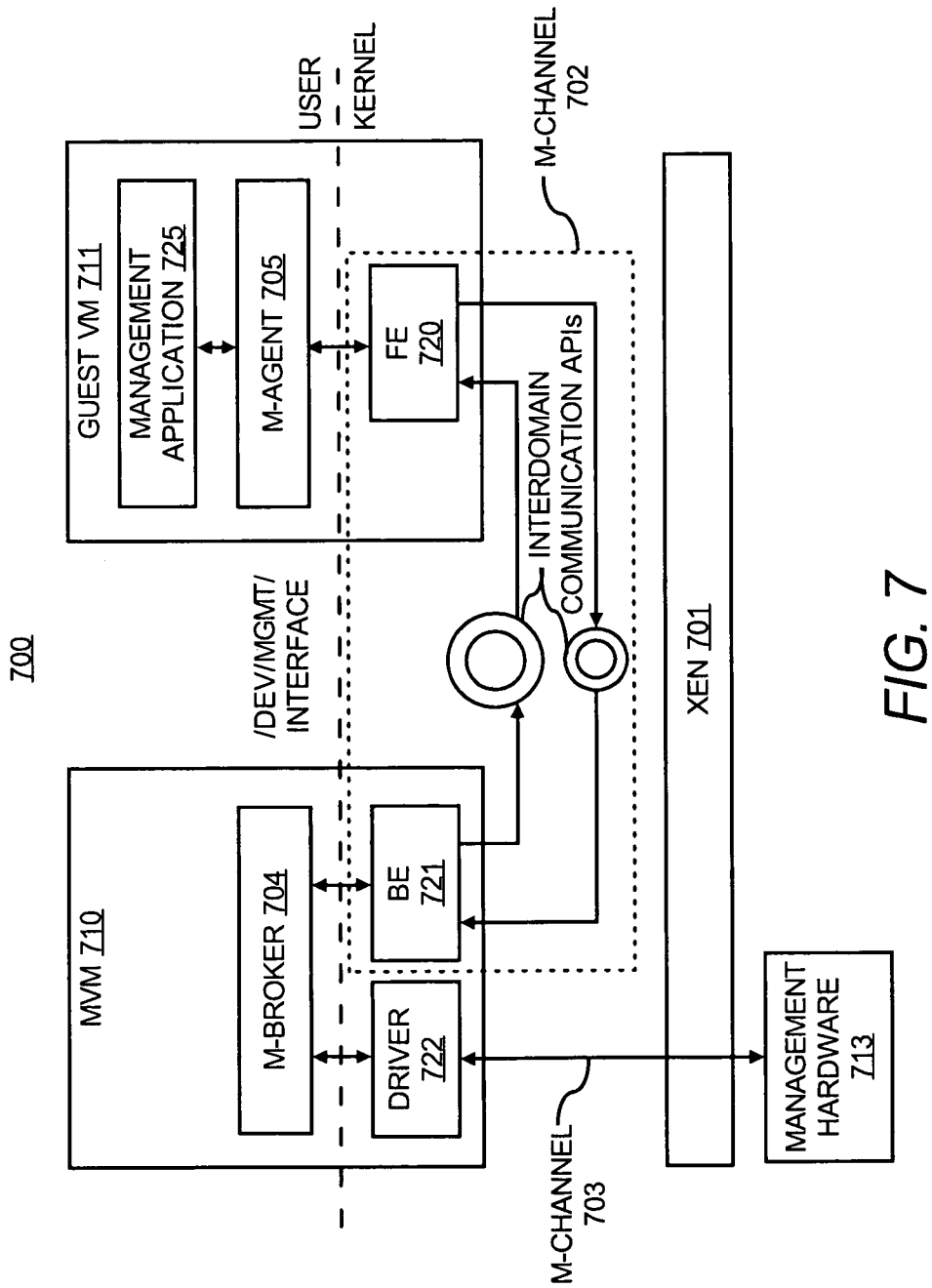
FIG. 7 illustrates an implementation of M-channels and M-brokers, according to an embodiment.

FIG. 7 shows an implementation 700 of M-brokers, M-agents, and M-channels in a system, according to an embodiment. This implementation is a Xen implementation. That is Xen is used at the virtualization layer 104 shown in FIG. 1. It will be apparent to one of ordinary skill in the art that other virtualization layers may be used.

FIG. 7 shows a Xen virtualization layer 701, M-channels 702 and 703, an M-broker 704 in an MVM 710 and an M-agent 705 in a guest VM 711. The M-broker 704 and the M-agent on the VM 711 include user-based and kernel-based interfaces to the M-channels 702 and 703.

The two different implementations of M-channels are used for inter-VM communication depending on whether the VMs are on the same machine or on different machine in a network. The M-channel 702 between local VMs 710 and 711 utilize the inter-domain communication APIs provided by Xenbus to provide shared memory communication. A management frontend (FE) module 720 runs inside the guest VM 711 kernel and communicates with a management backend (BE) module 721 inside the MVM 710 kernel. The FE module 720 and the BE module 721, which are part of the interfaces to the M-channel 702, represent the M-channel endpoints for the guest VM 711 and the MVM 710 respectively. The communication on the M-channel 702 is asynchronous and hence uses two different communication rings for the two directions (send and receive). When the FE module 720 loads, it allocates pages of shared memory for the two rings and shares the pages with the backend. If the sent or received data size is more than the ring element size, the data is passed by sharing the page containing the data and passing pointers to it. A typical M-channel ring data element includes three fields: an M-channel header, followed by an application-specific header, and followed by application specific data if any. This design creates a generic, simple and yet flexible infrastructure for transferring management related messages between VMs. It should be noted that the M-broker or M-agent may be provided in the virtualization layer, such as the virtualization layer 701, or in the application layer of a virtual machine.

Both the FE module 720 and the BE module 721 export a file interface, such as /dev/mgmt in Xen, to the user-level M-broker 704 and the M-agent 705 and the management application 705 if needed. An API interface may also be used, such as the APIs in table 1.

The M-channel 702 also enables the M-brokers and M-agents to coordinate over VM migrations. For example, during a VM migration of the guest VM 711 to another platform, the FE module 720 and the BE module 721 get notified of the VM migration event which triggers a new set of disconnections and reconnections. For example, the BE module 721 breaks its connection with the FE module 720 and a new FE module for the new M-channel on the new platform establishes a new connection with a BE module for a new MVM. This enables the M-agents and M-brokers inside guest VMs to remain transparent to migration and still be able to communicate with the current platform's M-broker in an MVM.

The M-channel 703 connected to the management hardware 713 may be implemented as a device driver 722 which communicates with a management hardware communication interface, such as a PCI interface in the case of a management processor. The driver 722 also exports a file interface and API interface (similar to shared memory M-channels) and provides the same basic interfaces as the VM-to-VM M-channel 702.

For distributed M-channels, a socket-based communication interface which provides the same APIs as the shared-memory-based implementation, is used. Specifically, all the M-channel endpoints run a TCP/IP server which listens on a well-known port and accepts connections from other M-channel endpoints. While currently not implemented, authentication mechanisms can be used to implement to establish secure channels between different VMs. In both implementations, the application-specific M-agents and M-brokers define their own message formats for M-channels which provides flexibility to the management applications.

An M-channel communication bridge between the FE module 720 and the BE module 721 is implemented as part of the BE module 721 and routes messages based on the address contained in the M-channel header. Similarly the bridge between the VMs 710 and 711 and the management hardware 713 is implemented as part of the M-broker 704 inside the MVM 710 and routes messages between them according to its policies (e.g. pass-though vs. virtualized access).

The MVM 710 is a privileged management VM which is the dedicated point to control all management tasks on a single platform, such as a single node. The MVM 710 coordinates between application requirements and platform management policies with the help of specific management hardware and inputs from applications running on the VMs, such as the management application 705 running on the guest VM 711.

The MVM 710 includes three main components not shown: (1) one or more M-brokers, (2) a high-level policy maker which creates the policies in the coordination modules in the M-brokers, and (3) M-channel interfaces. The policy maker is a management application that runs inside the MVM 710 and provides the system administrator with access to various policy controls. The policy maker can set the policies and goals for the M-broker and provide the status of management actions to the system administrator. The MVM 710 is a privileged and trusted VM with direct access to platform's hardware which sense and actuate useful management actions (e.g., the management hardware 713 including a management processor, sensors, a memory controller, etc.).

Effective power management requires timely and intelligent use of underlying management capabilities in order to balance possible power savings with application performance requirements. The M-channels, M-brokers and M-agents described above allow for power management methods that meet this criteria. The M-channels provide flexibility in the implementation of coordinating between different layers in the system. The M-channels allow for either a distributed or centralized M-broker for power management. Also, management specific data for power brokers, which are M-brokers used for power management, may be defined and passed through M-channels. The M-channels may be used to exchange heterogeneous data at different time constants, such as power data related to power consumption, CPU utilization, service level violations, etc. A power broker may use this information to enforce various power management policies and minimize service level violations. These service level violations may be associated with applications having different service level requirements. The applications may also be running on different VMs. Thus, power brokers and M-channels are easily used to implement various power management policies, including service-level-based power management in coordination with VM and hardware platform requirements.

Service-level-based power management is implemented using power brokers, M-channels and M-agents shown in the systems described above. For example, the M-brokers shown in FIGS. 5A-C may be power brokers performing service-level-based power management.

With respect to FIG. 5A, the M-broker 501 may be a power broker implementing service-level-based power management policies. The power broker 501 establishes M-channels 506 and 507 with M-agents, including M-agents 510 and 511. The M-agents include VM agents, such as M-agent 510, that monitor service levels for applications running in the VMs. For example, the VM 503 runs an application with specified service levels that are monitored by the M-agent 510. The M-agent 510 notifies the power broker 501 of service level violations. The power broker 501 administers specified policies, which set the p-state of the CPUs by using the service level violations as inputs and coordinating among them. Note that the application specific message formats within the generic M-channel headers allow for flexibility in implementing arbitrary SLA models (e.g. hard and soft SLA violations, different metrics for SLA violations, etc.). The power broker, then, uses inputs from the M-channels to make power management decisions, such as invoking actuators, such as controlling the p-state of CPUs. A system may have multiple power brokers, each implementing power management policies. Also note that FIG. 5A shows application and hardware coordination not available in conventional systems.

The M-agents can communicate with a power broker, for example in a management VM, via an M-channel to notify of service level violations and provide other information. Also, M-agents in the VMs may monitor logs capturing relevant application metrics to identify service level violations. Logs may be generated by the application server.

Some examples of polices implemented by the power brokers include a basic policy where the M-agent records the number of service level violations within epochs (e.g., 500 ms each) and at the end of each epoch if the percentage of violations exceeds a threshold (e.g., 1%), a service level violation notification is sent to the power broker, which increases the p-state of the VM's CPU to the next higher value. A parallel thread also monitors the VM's CPU utilization, and when the utilization goes below a certain threshold (e.g., 80%), the VM's CPU is reduced to a next lower p-state. A p-state may be increased or decreased using DVFS. For a particular physical CPU, all the VMs' p-states are examined and the highest p-state may be set as the p-state of the CPU.

By basing the p-state decision on a service level violation, rather than solely based on CPU utilization, more power may be conserved. For example, if the SLA specifies a 10 ms response time, and the CPU utilization is high but the response time is at 9 ms, then the p-state of the CPU is not increased. If the decision was based on CPU utilization, the p-state would unnecessarily be increased, resulting in the consumption of more power.

Another example of a policy includes a more sophisticated notification criteria where service levels are defined as hard (e.g., higher response time threshold) and soft (e.g., lower response time threshold). The VM agent sends information whether a hard service level violation or a soft service level violation was experienced. The power broker can, then, employ more sophisticated management policies. For hard violations, the policy is the same as the example above. For soft violations, however, violations are recorded for 10 consecutive epochs. If the soft violations happen more than 30%, it is treated as a hard service level violation and action is taken, such as increasing p-state. Otherwise, soft violations are ignored.

Another example of a policy utilizes a VM-based on-demand power governor to decide p-state based on CPU utilization. The p-state decision is communicated to the power broker via an M-channel. The power broker uses a coordination policy to decide the final p-state of the CPU.

FIG. 5B shows M-brokers 521*a-b* in the VM 513*a* and management hardware 524*a* respectively. The M-brokers 521*a-b* may be power brokers that can receive service level violation notifications from M-agents in VMs, and migrate VMs or control p-state to manage power consumption. For example, M-broker 521*a* is a power broker. The power broker 521*a* periodically (e.g., every 5 minutes) queries the M-agent 530*b* in the management hardware 524*b* for current average and peak power consumption of the CPU. If these limits are violated, as an example policy, the power broker 521 first reduces the p-state of the CPU (or set of CPUs) to bring the power consumption within the limits. If this action causes a sharp increase in service level violations, the power broker 521*a* queries other broker's in the data center to find a less heavily loaded machine (with power consumptions well within limits) and migrates the VM to that machine to maintain the service levels of the application. FIG. 5B shows VM-hardware coordination that allows VM migration, and is not available in current systems.

The p-state of a CPU hosting multiple VMs may be varied and different for each VM. For example, when each VM gets scheduled, the hypervisor communicates the needed p-state to management hardware to place the CPU in the desired p-state. Thus, the desired power conservation can be achieved.

FIG. 5C shows a system where M-brokers 531*a-n* are distributed across VMs 533*a-n*. The VMs 533*a-n* may be in a single node or distributed across multiple nodes. The M-channel 536 may include one or more M-channels for a distributed system and/or a single system. The M-brokers 531*a-n* may be power brokers that communicate and jointly make power and coordination decisions based on stored policies. FIG. 5C shows VM-to-VM independent decision making. For example, each VM 533*a-n* runs its own application-specific power broker 531*a-n* respectively. These power brokers are charged with performing power management themselves by determining power states for the respective VM's resources based on certain policies, such as policies based on service level violations. For example, the power brokers in the VMs identify service level violations, and based on policy, make p-state decisions. These brokers, then, send the requested p-states to the management VM via an M-channel to implement the desired p-state. The management VM checks the desired p-state for other VMs and makes final decision and changes power state when it runs a particular VM.

In various examples described above, VM migration is employed to reduce power consumption. For example, when service level violation frequency increases beyond a certain threshold, the power broker requests migration of the VM to a less loaded CPU. A list of hosts is searched to find a suitable destination for the migration. For example, a host which has the least CPU utilization is selected. However, making a decision based on current utilization may be short sighted because the CPU utilization may go up after VM migration, which may cause further VM migrations to happen. Thus, according to an embodiment, intelligent VM placement is performed. Note that the p-state of a processor may be reduced first if a power cap is exceeded. If this results in a service level violation, then intelligent VM placement is performed.

Intelligent VM placement includes calculating the probability of a host satisfying CPU requirements for a period of time into the future when making migration decision. For example, mean CPU utilization and variance of every VM is tracked and stored over time. During the selection of a target host for VM migration, the mean CPU utilization and variance is used to calculate the probability of the host satisfying the VM requirements over some future time period. The intelligent VM placement can thus minimize the situation where a VM is continuously migrated due to poor placement decisions.

A power budget may be considered when controlling power consumption. For example, a power budget specifies a maximum power consumption, i.e., a power cap, for a system. If the power cap is exceeded, an actuator, such as VM migration, is invoked to reduce power consumption of a CPU. In another example, instead of VM migration, a p-state actuator, such as DVFS of CPUs, is used to control power consumption. However, this may result in system instability as described below.

In particular, the lack of coordination between performance management and power capping can lead to conflicts between the two. For example, when a service level of an application is violated, the power broker increases the CPU frequency to handle the load but this also increases the power consumption which may in turn violate the power budget of the CPU. To handle the power violation, the CPU frequency is reduced, which again causes additional service level violations, thereby resulting in a lack of stability.

According to an embodiment, a power broker implements a policy that migrates one or more VMs to relatively less loaded host(s) to reduce load and increase stability. For example, when the frequency of power budget violations or service level violations crosses a certain threshold, a relatively less loaded host is identified. Then, the VM is migrated to the identified host, thereby resolving the oscillation between service level and power budget violations.

Figure 8:
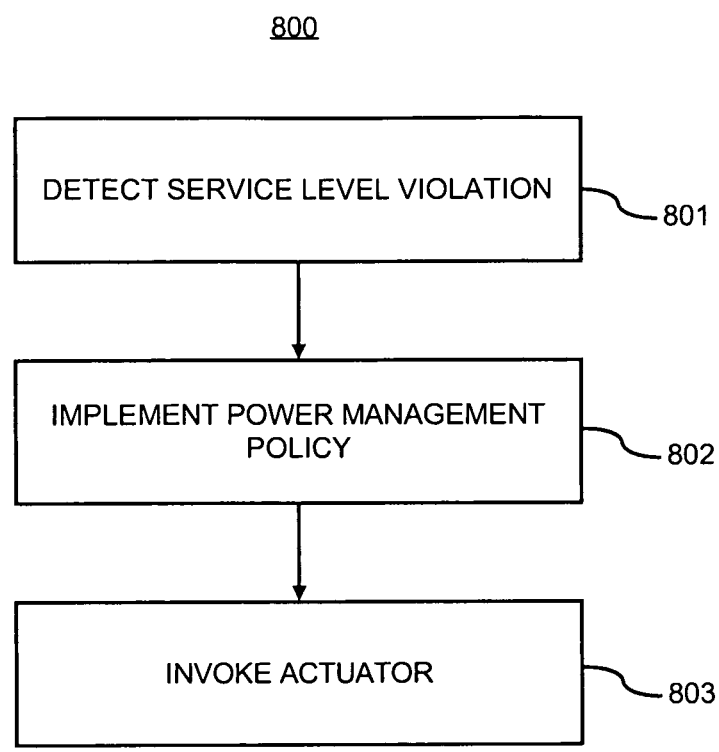
FIG. 8 illustrates a flow chart of a method for cross-layer power management, according to an embodiment.

FIG. 8 illustrates a method 800 for cross-layer power management, according to an embodiment. At step 801, a service level violation is detected. For example, an M-agent sends notification to a power broker that frequency of a service level violation exceeds a threshold.

At step 802, the power broker implements a power management policy in response to the notification of the service level violations. Examples of the polices are described above.

At step 803, an actuator in the hardware layer and/or the virtualization layer is invoked to suppress the service level violation and satisfy the power management policy. This may include increasing p-state and/or VM migration. Actuators in both the hardware layer and the virtualization layer may be used in a single run to suppress a power cap violation or a service level violation. In a single run means, for example, the power broker makes a decision to use both virtualization layer and hardware layer actuators or one or more of the actuators in response to detecting a particular event, such as a potential power cap violation or potential service level violation, and both actuators may be used to suppress the violation. One or more of the steps of the method 800 and other steps described herein may be implemented as software stored on a computer readable medium. While the embodiments have been described with reference to examples, those skilled in the art will be able to make various modifications to the described embodiments without departing from the scope of the claimed embodiments.

What is claimed is:

1. A method of cross-layer power management in a multi-layer system, the method comprising:
   determining whether there is a service level violation for an application running on a hardware platform; and
   controlling power consumption of the hardware platform in response to the service level violation.

2. The method of claim 1, wherein the multi-layer computer system includes an application layer, a hardware layer and a virtualization layer including virtual machines, each layer including at least one from a group comprising a sensor and an actuator for controlling power consumption, and
   determining whether there is a service level violation comprises receiving service level violation information for the application from a sensor at the application layer; and
   controlling power consumption comprises using an actuator at the hardware layer or the virtual machine layer to control power consumption of the hardware platform.

3. The method of claim 2, wherein the multi-layer computer system comprises at least one management channel providing bidirectional communication between management entities, wherein one or more of the management entities include a management application running on a virtual machine; at least one management broker implementing a coordination policy for coordinating information from one or more of the management entities and making actuation decisions based on the information and the coordination policy; and at least one management agent communicating information from the management on the at least one management channel to the at least one management broker, wherein the method comprises:
   using the at least one management channel, the at least one management broker, and the at least one management agent to collect the service level violation information and information related to power consumption to control the actuator to control the power consumption of the hardware platform.

4. The method of claim 3, wherein controlling power consumption comprises the at least one management broker determining whether to control power consumption based on one or more power management policies, wherein the at least one management broker is provided in at least one of a management processor, a management virtual machine and a virtual machine.

5. The method of claim 2, wherein controlling power consumption comprises using an actuator in the hardware layer or the virtual machine layer to control power consumption of the hardware platform comprises:
   increasing or reducing a power state of a processor to control the power consumption and minimize service level violations.

6. The method of claim 2, wherein controlling power consumption comprises using an actuator in the hardware layer or the virtual machine layer to control power consumption of the hardware platform comprises:
   selecting another processor that has capacity to host a virtual machine running the application having the service level violation; and
   migrating the virtual machine to the another processor.

7. The method of claim 6, wherein selecting another processor that has capacity to host a virtual machine running the application having the service level violation further comprises:
   calculating a probability of the another processor being able to satisfy processor capacity requirements for the virtual machine for a period of time into the future.

8. The method of claim 2, further comprising:
   determining whether a power cap is exceeded; and
   migrating a virtual machine or reducing power-state of a processor if the power cap is exceeded.

9. The method of claim 8, wherein if the power cap is exceeded, reducing the power-state of the processor; and
   if a service level violation occurs after reducing the power-state, then migrating a virtual machine from the processor to another processor.

10. A system for coordinating information between management entities in different layers of the system, the system comprising:
    at least one management channel providing bidirectional communication between the management entities, wherein one or more of the management entities include a management agent or a management broker communicating information for application service level violations and information related to power consumption to another management entity; and at least one management broker implementing a power management policy for managing power consumption and service level violations by coordinating information received via the at least one management channel from one or more of the management entities and making actuation decisions based on the information and the power management policy.

11. The system of claim 10, wherein at least some of the management entities are configured to monitor application metrics for applications running on virtual machines and the applications have different service level requirements, and
the at least one management broker is configured to manage power consumption and service level violations associated with the different service level requirements.

12. The system of claim 10, wherein the management entities comprise entities in a hardware layer, a virtualization layer and an application layer.

13. The system of claim 10, wherein one or more of the management entities comprises a power broker that coordinates between a power regulation policy and a power budget policy to minimize system instability.

14. A power management system comprising:
a power broker monitoring data, including service level violations, virtual machine utilization and power consumption of one or more computer systems; and
actuators available at a hardware platform layer and a virtual machine layer, wherein the power broker is configured to use the actuators in one or more of the hardware platform layer and the virtual machine layer in a single run to control power consumption of the one or more computer systems based on the monitored data.

15. The power management system of claim 14, further comprising:
sensors at an application layer providing the monitored data associated with service level violations, and the power broker is configured to use the actuators to control service level violations and minimize power consumption.

\* \* \* \* \*